(12) United States Patent
Kita et al.

(10) Patent No.: US 8,993,682 B2
(45) Date of Patent: Mar. 31, 2015

(54) POLYELECTROLYTE AND PROCESS FOR PRODUCING THE POLYELECTROLYTE

(75) Inventors: Kohei Kita, Tokyo (JP); Takahiko Murai, Tokyo (JP); Naoki Sakamoto, Tokyo (JP); Naoto Miyake, Tokyo (JP); Tadashi Ino, Osaka (JP); Noriyuki Shinoki, Osaka (JP); Masaharu Nakazawa, Osaka (JP); Masahiro Kondo, Osaka (JP); Takashi Yoshimura, Osaka (JP)

(73) Assignees: Asahi Kasei E-Materials Corporation, Tokyo (JP); Daikin Industries, Ltd., Osaka (JP)

( * ) Notice: Subject to any disclaimer, the term of this patent is extended or adjusted under 35 U.S.C. 154(b) by 509 days.

(21) Appl. No.: 12/933,325

(22) PCT Filed: Mar. 12, 2009

(86) PCT No.: PCT/JP2009/054746
§ 371 (c)(1),
(2), (4) Date: Sep. 17, 2010

(87) PCT Pub. No.: WO2009/116446
PCT Pub. Date: Sep. 24, 2009

(65) Prior Publication Data
US 2011/0020728 A1    Jan. 27, 2011

(30) Foreign Application Priority Data

Mar. 19, 2008 (JP) .................................. 2008-071245

(51) Int. Cl.
*C08F 28/02* (2006.01)
*H01M 8/10* (2006.01)
(Continued)

(52) U.S. Cl.
CPC ............ *H01M 8/1039* (2013.01); *C08F 14/185* (2013.01); *C08F 28/02* (2013.01);
(Continued)

(58) Field of Classification Search
USPC ........ 525/326.2, 353; 526/243, 287; 429/483, 429/498; 521/25, 27
See application file for complete search history.

(56) References Cited

U.S. PATENT DOCUMENTS 5,281,680 A    1/1994  Grot
6,559,237 B1 *  5/2003  Mao et al. .................. 525/326.2
(Continued)

FOREIGN PATENT DOCUMENTS

EP    0 498 076 A1    8/1992
EP    0 289 869 B1    3/1995
(Continued)

OTHER PUBLICATIONS

James Fenton; "Lead Research and Development Activity for DOE's High Temperature, Low Relative Humidity Membrane Program"; University of Central Florida—FSED; May 16, 2007; pp. 1-10.
(Continued)

*Primary Examiner* — Robert C Boyle
(74) *Attorney, Agent, or Firm* — Sughrue Mion, PLLC

(57) ABSTRACT

The present invention provides an electrolyte having high conductivity even under high-temperature low-humidification conditions (e.g. at a temperature of 100 to 120° C. and a humidity of 20 to 50% RH) and thereby makes it possible to realize a higher performance fuel cell. The present invention is a fluoropolymer electrolyte having an equivalent weight (EW) of not less than 250 but not more than 700 and a proton conductivity of not lower than 0.10 S/cm as measured at a temperature of 110° C. and a relative humidity of 50% RH and comprising a COOZ group- or $SO_3Z$ group-containing monomer unit, wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom.

13 Claims, 1 Drawing Sheet

(51) Int. Cl.
*C08F 14/18* (2006.01)
*C08F 20/04* (2006.01)
*C08F 2/26* (2006.01)
*C08F 8/12* (2006.01)
*C08F 214/26* (2006.01)
*C08J 5/22* (2006.01)
*H01B 1/12* (2006.01)
*C08F 8/22* (2006.01)
*C08F 6/22* (2006.01)
*C08F 8/44* (2006.01)

(52) U.S. Cl.
CPC ............ *C08F 2810/00* (2013.01); *C08F 20/04* (2013.01); *C08F 2/26* (2013.01); *C08F 8/12* (2013.01); *C08F 214/262* (2013.01); *C08F 2800/10* (2013.01); *C08F 2810/50* (2013.01); *C08J 5/2237* (2013.01); *H01B 1/122* (2013.01); *H01M 8/1023* (2013.01); *Y02E 60/522* (2013.01); *C08J 2327/18* (2013.01); *C08F 8/22* (2013.01); *C08F 6/22* (2013.01); *C08F 8/44* (2013.01)
USPC ........ 525/326.2; 525/353; 526/243; 526/287; 429/483; 429/498; 429/494; 429/493; 429/492; 521/25; 521/27

(56) References Cited

U.S. PATENT DOCUMENTS

| | | | |
|---|---|---|---|
| 7,455,934 B1* | 11/2008 | Araki et al. | 429/309 |
| 2003/0146148 A1* | 8/2003 | Wu et al. | 210/483 |
| 2004/0242708 A1* | 12/2004 | Hasegawa et al. | 521/27 |
| 2005/0053822 A1 | 3/2005 | Miyake et al. | |
| 2005/0130006 A1 | 6/2005 | Hoshi et al. | |
| 2006/0141315 A1 | 6/2006 | Murata et al. | |
| 2006/0199062 A1 | 9/2006 | Yanagita et al. | |
| 2008/0138685 A1 | 6/2008 | Kaneko et al. | |
| 2008/0166601 A1 | 7/2008 | Honmura et al. | |

FOREIGN PATENT DOCUMENTS

| | | | |
|---|---|---|---|
| EP | 1323744 A1 | | 7/2003 |
| EP | 1323751 A2 | | 7/2003 |
| JP | 63-297406 A | | 12/1988 |
| JP | 4-366137 A | | 12/1992 |
| JP | 6-322034 A | | 11/1994 |
| JP | 2002-352819 A | | 12/2002 |
| JP | 2003-246822 A | | 9/2003 |
| JP | 2005-511830 A | | 4/2005 |
| JP | 2006-173098 A | | 6/2006 |
| JP | 2006-277984 A | | 10/2006 |
| JP | 2007-112906 A | | 5/2007 |
| JP | 2007-112907 A | | 5/2007 |
| WO | WO99/59216 | * | 11/1999 |
| WO | 02/096983 A1 | | 12/2002 |
| WO | 03050151 A1 | | 6/2003 |
| WO | 2005000949 A1 | | 1/2005 |
| WO | 2005029624 A1 | | 3/2005 |
| WO | 2005/103161 A1 | | 11/2005 |
| WO | 2006028190 A1 | | 3/2006 |
| WO | 2007013533 A1 | | 2/2007 |
| WO | 2008084701 A1 | | 7/2008 |
| WO | 2009068528 A1 | | 6/2009 |

OTHER PUBLICATIONS

Manale Maalouf, et al.; "New Ionomeric membranes for high temperature proton exchange membrane fuel cells: Effects of different side chains' acidity on conductivity"; Abstract #732; 218th ECS Meeting; 2010; The Electrochemical Society.

Mark S. Schaberg, et al.; "New Multi Acid Side-Chain Ionomers for Proton Exchange Membrane Fuel Cells"; ECS Transactions; 2010; vol. 33; Issue 1; pp. 627-633.

Martin R. Tant, et al.; "Structure and Properties of Short-Side-Chain Perfluorosulfonate Ionomers"; Multiphase Polymers: Blends and Ionomers; Chapter 15; American Chemical Society; 1989; pp. 370-400.

* cited by examiner

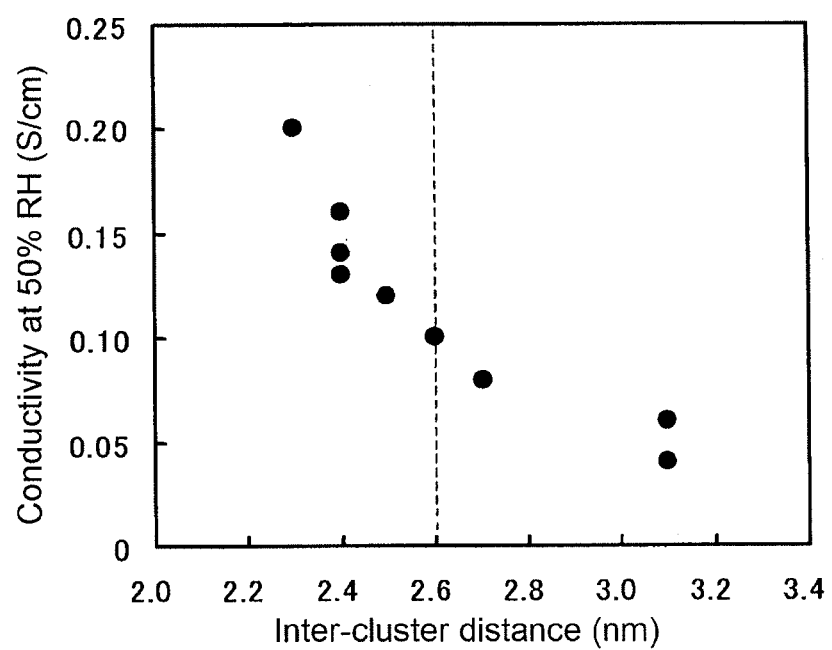

POLYELECTROLYTE AND PROCESS FOR PRODUCING THE POLYELECTROLYTE

TECHNICAL FIELD

The present invention relates to a polymer electrolyte suited for an electrolyte membrane for a solid polymer electrolyte fuel cell and to a production method for the same, among others.

BACKGROUND ART

A fuel cell, in which such a fuel as hydrogen or methanol is electrochemically oxidized to thereby convert a chemical energy of the fuel directly to electrical energy for consumption, has attracted attention as a clean electric energy supply source. In particular, a solid polymer electrolyte fuel cell, which can operate at lower temperatures as compared with other fuel cells, is expected to be useful as or in an alternative automotive power source, a cogeneration system for household use and a portable electric generator, among others.

Such a solid polymer electrolyte fuel cell is at least equipped with a membrane-electrode assembly which comprises an electrolyte membrane and two gas diffusion electrodes joined thereto in the manner of sandwiching the same between them, each of the electrodes being an electrode catalyst layer-gas diffusion layer laminate. The electrolyte membrane so referred to herein is a material having strongly acidic groups such as sulfonic acid groups or carboxylic acid groups within each polymer chain and having a selective permeability for proton. Preferably used as such an electrolyte membrane is perfluorinated proton exchange membrane, typically Nafion (registered trademark; products of du Pont) having high chemical stability.

On the occasion of operation of a fuel cell, a fuel (e.g. hydrogen) is fed to the gas diffusion electrode on the anode side, and an oxidizing agent (e.g. oxygen or air) to the gas diffusion electrode on the cathode side, and both the electrodes are connected to each other via an external circuit, whereby an operation of the fuel cell is realized. More specifically, when hydrogen is used as the fuel, hydrogen is oxidized on an anode catalyst to give protons. The protons pass through an electrolyte binder within an anode catalyst layer and then migrate within the electrolyte membrane and then through an electrolyte binder within a cathode catalyst layer to arrive at the cathode catalyst surface. On the other hand, the electrons formed simultaneously with the protons by the oxidation of hydrogen travel through the external circuit to arrive at the gas diffusion electrode on the cathode side. On the cathode catalyst, the protons react with oxygen in the oxidizing agent to form water. And, on that occasion, electric energy is generated.

Owing to a characteristic feature that it is of a reduced environmental load type and can secure high energy conversion efficiency, the solid polymer electrolyte fuel cell is expected to be usable in a stationary cogeneration system or serve as a vehicle-mounted power source. In the current automotive field, a fuel cell is generally operated at about 80° C. For the spread of fuel cell vehicles, however, it is necessary to reduce a radiator size, simplify a humidifier and attain cost reduction. To that end, those electrolyte membranes are desired which are appropriate for operation under high-temperature low-humidification conditions (corresponding to an operation temperature of 100 to 120° C. and a humidity of 20 to 50% RH) and can show high performance in a wide-ranging operation environment (room temperature to 120° C./20 to 100% RH). More specifically, a proton conductivity at 50% RH of not lower than 0.10 S/cm is required to enable operation at a temperature of 100° C., and a proton conductivity at 20% RH of not lower than 0.10 S/cm is required to enable operation at a temperature of 120° C., as shown in Non-Patent Document 1.

However, a conductivity of the prior art perfluorinated proton exchange membrane greatly depends on the humidity and markedly drops at a humidity of 50% RH or below, in particular. Therefore, Patent Documents 1 to 3 disclose fluorinated electrolyte membranes having an equivalent weight (EW), namely a dry weight per equivalent of proton exchange groups, of 670 to 776 EW (g/eq). By lowering the EW value in this manner, namely by increasing a proton exchange capacity, it becomes possible to produce improvements in conductivity. Further, Patent Document 4 discloses electrolyte membranes hardly soluble in hot water in spite of their having a low EW value, mentioning, as an example, an electrolyte membrane with an EW of 698. Patent Document 5 discloses a production example for a polymer electrolyte with an EW of 564.

It is also known that a perfluorinated proton exchange membrane becomes deteriorated after a prolonged period of use; hence, various methods of stabilization have been proposed. Thus, for example, Patent Document 6 discloses fluoropolymer electrolytes obtained through a polymerization process in which the copolymerization is carried out at a polymerization temperature of 0 to 35° C. using a radical polymerization initiator which comprises a fluorinated compound having a molecular weight of not lower than 450.

Patent Document 1: Japanese Kokai Publication H06-322034
Patent Document 2: Japanese Kokai Publication H04-366137
Patent Document 3: WO 2002/096983
Patent Document 4: Japanese Kokai Publication 2002-352819
Patent Document 5: Japanese Kokai Publication S63-297406
Patent Document 6: Japanese Kokai Publication 2006-173098
Non-Patent Document 1: H. Gasteiger and M. Mathias, In Proton Conducting Membrane Fuel Cells, PV2002-31, pp. 1-22, The Electrochemical Society Proceedings Series (2002).

DISCLOSURE OF INVENTION

Problems which the Invention is to Solve

However, the electrolyte membranes disclosed in the above-cited Patent Documents 1 to 6 show still low conductivity levels, far from 0.10 S/cm, at a humidity of 50% RH or below. It is an object of the present invention to provide an electrolyte having high conductivity even under high-temperature low-humidification conditions and thereby make it possible to realize a higher performance fuel cell.

Means for Solving the Problems

As a result of inventive investigations made by the present inventors, it was found that a use of a fluorinated electrolyte precursor prepared by a particular process for polymerization makes it possible to control an ion cluster structure to be formed in a fluorinated electrolyte and that by controlling the ion cluster structure of an electrolyte membrane, it becomes possible to realize high levels of conductivity even at low humidity levels. Such findings have led to completion of the present invention.

The present invention thus provides a polymer electrolyte membrane, a production method thereof, a membrane-electrode assembly, and a solid polymer electrolyte fuel cell.

(1) A fluoropolymer electrolyte having an equivalent weight (EW) of not less than 250 but not more than 700 and a proton conductivity of not lower than 0.10 S/cm as measured at a temperature of 110° C. and a relative humidity of 50% RH and which comprises a COOZ group- or $SO_3Z$ group-containing monomer unit, wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom.

(2) The fluoropolymer electrolyte according to (1), which comprises a repeating unit (α) derived from a COOZ group- or $SO_3Z$ group-containing monomer represented by the general formula (I):

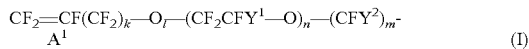

(I)

wherein $Y^1$ represents F, Cl or a perfluoroalkyl group; k represents an integer of 0 to 2, l represents 0 or 1, and n represents an integer of 0 to 8 and n atoms or groups of $Y^1$ may be the same or different; $Y^2$ represents F or Cl; m represents an integer of 0 to 6 provided that when m=0, l=0 and n=0; m atoms of $Y^2$ may be the same or different; and $A^1$ represents COOZ or $SO_3Z$ in which Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom, and a repeating unit (β) derived from an ethylenic fluoromonomer copolymerizable with the COOZ group- or $SO_3Z$ group-containing monomer, the content of the repeating unit (α) being 10 to 95 mole percent and the content of the repeating unit (β) being 5 to 90 mole percent, with the sum of the repeating unit (α) content and the repeating unit (β) content being 95 to 100 mole percent.

(3) The fluoropolymer electrolyte according to (2), wherein k is 0, l is 1, $Y^1$ is F, n is 0 or 1, $Y^2$ is F, m is 2 or 4 and $A^1$ is —$SO_3H$.

(4) The fluoropolymer electrolyte according to (3), wherein n is 0 and m is 2.

(5) The fluoropolymer electrolyte according to (1), (2), (3) or (4), wherein the distance between ionic clusters at 25° C. and a relative humidity of 50% RH as calculated from the formula (1) given below following small angle X-ray scattering measurement is not shorter than 0.1 nm but not longer than 2.6 nm:

$$d=\lambda/2/\sin(\theta m) \quad (1)$$

wherein d is the distance between ionic clusters, λ is wavelength of incident X ray used in small angle X-ray scattering measurement and θm is peak-showing Bragg angle.

(6) The fluoropolymer electrolyte according to (1), (2), (3), (4) or (5), which is obtained by a chemical treatment of a fluoropolymer electrolyte precursor, wherein the fluoropolymer electrolyte precursor has a group convertible to COOZ or $SO_3Z$ (wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom) upon the chemical treatment, is melt-flowable and has a melt flow rate of 0.01 to 100 g/10 minutes.

(7) The fluoropolymer electrolyte according to (6), wherein the chemical treatment comprises immersion in an basic reacting liquid.

(8) An electrolyte membrane constituted of the fluoropolymer electrolyte according to (1), (2), (3), (4), (5), (6) or (7).

(9) An electrolyte solution containing the fluoropolymer electrolyte according to (1), (2), (3), (4), (5), (6) or (7).

(10) A membrane-electrode assembly comprising the fluoropolymer electrolyte according to (1), (2), (3), (4), (5), (6) or (7).

(11) A solid polymer fuel cell comprising the membrane-electrode assembly according to (10).

(12) A production method for a fluoropolymer electrolyte, comprising a step (1) of obtaining a fluoropolymer electrolyte precursor by emulsion polymerization and a step (2) of obtaining the fluoropolymer electrolyte by subjecting the fluoropolymer electrolyte precursor to a chemical treatment, the fluoropolymer electrolyte having an equivalent weight (EW) of not less than 250 but not more than 700 and a proton conductivity of not lower than 0.10 S/cm as measured at a temperature of 110° C. and a relative humidity of 50% RH and comprising a COOZ group- or $SO_3Z$ group-containing monomer unit, wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom.

(13) The production method according to (12), wherein the step (1) comprises carrying out the emulsion polymerization at a temperature of not lower than 0° C. but not higher than 40° C.

(14) The production method according to (12) or (13), wherein the fluoropolymer electrolyte precursor has a group convertible to COOZ or $SO_3Z$ (wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom) by the chemical treatment, is melt-flowable and has a melt flow rate of 0.01 to 100 g/10 minutes.

Effects of the Invention

The fluoropolymer electrolyte according to the invention shows high proton conductivity even under low humidity conditions and can provide a fuel cell having good performance characteristics.

BEST MODES FOR CARRYING OUT THE INVENTION

Hereinafter, best modes for carrying out the present invention (hereinafter, "modes of practice of the invention") are described in detail. The invention is not limited to the modes of practice described below but can be carried out in various modified modes falling within the scope of the invention.

The fluoropolymer electrolyte according to the invention has an equivalent weight (EW), namely a dry weight per equivalent of ion exchange groups, of not less than 250 but not more than 700. An upper limit to EW is preferably 650, more preferably 600, still more preferably 550. A lower limit to EW is preferably 300, more preferably 350, still more preferably 400. A low level of EW is preferred in view of the resulting increased level of conductivity but may sometimes result in increased solubility in hot water; therefore, such an appropriate range as mentioned above is desired.

The fluoropolymer electrolyte according to the invention has a proton conductivity of not lower than 0.10 S/cm as measured at a temperature of 110° C. and a relative humidity (RH) of 50%. Preferably, it has a proton conductivity at 40% RH of not lower than 0.10 S/cm; more preferably, it has a proton conductivity at 30% RH of not lower than 0.10 S/cm; still more preferably, it has a proton conductivity at 20% RH of not lower than 0.10 S/cm. As for the proton conductivity of the fluoropolymer electrolyte according to the invention, the higher, the better; however, the proton conductivity at a temperature of 110° C. and a relative humidity of 50% RH may be, for example, not higher than 1.0 S/cm.

Further, the fluoropolymer electrolyte according to the invention has a particular ion cluster structure. Thus, the fluoropolymer electrolyte according to the invention preferably has a distance between ionic clusters of not shorter than 0.1 nm but not longer than 2.6 nm as measured at 25° C. and 50% RH. FIG. 1 is a graphic representation of a relation between the distance between ionic clusters (abscissa) and the ionic conductivity (ordinate) under high-temperature low-humidification conditions as obtained by plotting the results obtained in the examples and comparative examples given later herein; the FIGURE indicates that the distance between ionic clusters of not longer than 2.6 nm result in rapid increases in the conductivity.

A more preferred upper limit to the distance between ionic clusters is 2.5 nm. A lower limit to the distance between ionic clusters is more preferably 0.5 nm, still more preferably 1.0 nm, most preferably 2.0 nm.

The ion cluster is an ion channel formed as a result of gathering of a plurality of proton exchange groups, and perfluorinated proton exchange membranes, typically Nafion membranes, are also considered to have such an ion cluster structure (cf. e.g. Gierke, T. D., Munn, G. E., Wilson, F. C. J. Polymer Sci. Polymer Phys., 1981, 19, 1687).

The distance between ionic clusters d can be determined by the measurement and calculation methods mentioned below.

A fluoropolymer electrolyte in the form of a membrane is subjected to small angle X-ray scattering measurement in an atmosphere maintained at 25° C. and 50% RH. Scattering intensities obtained are plotted against Bragg angles θ, and the Bragg angle θm at the position of the cluster structure-due peak generally appearing at 2θ>1° is calculated. The distance between ionic clusters d is calculated from θm according to the following expression (1):

$$d = \lambda/2/\sin(\theta m) \qquad (1)$$

(where λ is incident X ray wavelength.)

In cases where the membrane is prepared by casting, the membrane is annealed beforehand at 160° C. The fluoropolymer electrolyte is treated so that the terminal groups thereof as represented by COOZ or $SO_3Z$ may be converted to COOH or $SO_3H$ groups. Prior to the measurement, the sample membrane is maintained in an atmosphere maintained at 25° C. and 50% RH for at least 30 minutes and, then, the measurement is carried out.

The fluoropolymer electrolyte according to the invention, which has a short distance between ionic clusters, supposedly facilitates the transfer of protons between ion clusters; thus, it shows high conductivity even at low humidity levels.

The fluoropolymer electrolyte according to the invention has a COOZ group- or $SO_3Z$ group-containing monomer unit (wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom).

In the above-mentioned fluoropolymer electrolyte, the COOZ group- or $SO_3Z$ group-containing monomer units preferably account for 10 to 95 mole percent of all monomer units. The term "all monomer units" as used herein refers to all monomer-derived moieties from the viewpoint of the molecular structure of the fluoropolymer electrolyte.

The COOZ group- or $SO_3Z$ group-containing monomer unit mentioned above is generally derived from a COOZ group- or $SO_3Z$ group-containing monomer represented by the general formula (I):

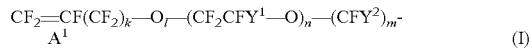

$$CF_2 = CF(CF_2)_k - O_l - (CF_2CFY^1 - O)_n - (CFY^2)_m - A^1 \qquad (I)$$

wherein $Y^1$ represents F, Cl or a perfluoroalkyl group; k represents an integer of 0 to 2, l represents 0 or 1, and n represents an integer of 0 to 8 and n atoms or groups of $Y^1$ may be the same or different; $Y^2$ represents F or Cl; m represents an integer of 0 to 6 provided that when m=0, l=0 and n=0; m atoms of $Y^2$ may be the same or different; and $A^1$ represents COOZ or $SO_3Z$ in which Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom.

Referring to the above general formula (I), it is more preferred from the synthesis and operability viewpoint that k be equal to 0, l to 1, and n to 0 or 1, still more preferably to 0, and that $Y^2$ be F and m be an integer of 2 to 6, still more preferably $Y^2$ be F and m be 2 or 4, most preferably $Y^2$ be F and m be 2.

In producing the fluoropolymer electrolyte mentioned above, the COOZ group- or $SO_3H$ group-containing monomer mentioned above may be used singly or in combination of two or more species.

The fluoropolymer electrolyte according to the invention is preferably a copolymer comprising the repeating unit (α) derived from the COOZ group- or $SO_3Z$ group-containing monomer mentioned above and the repeating unit (β) derived from an ethylenic fluoromonomer copolymerizable with the COOZ group- or $SO_3Z$ group-containing monomer.

The ethylenic fluoromonomer which is to constitute the repeating unit (β) mentioned above is a monomer having vinyl group but having no ether oxygen (—O—), and the hydrogen atoms of the vinyl group may be partially or fully substituted by fluorine atom or fluorine atoms.

The "ether oxygen" so referred to herein means the —O— structure constituting the monomer molecule.

As the above ethylenic fluoromonomer, there may be mentioned, for example, a haloethylenic fluoromonomer represented by the general formula (II):

$$CF_2 = CF - Rf^1 \qquad (II)$$

wherein $Rf^1$ represents F, Cl or a straight or branched fluoroalkyl group containing 1 to 9 carbon atoms, or a hydrogen-containing fluoroethylenic fluoromonomer represented by the general formula (III):

$$CHY^3 = CFY^4 \qquad (III)$$

wherein $Y^3$ represents H or F and $Y^4$ represents H, F, Cl or a straight or branched fluoroalkyl group containing 1 to 9 carbon atoms.

As the above ethylenic fluoromonomer, there may be mentioned, for example, tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene and perfluorobutylethylene; among them, TFE, VDF, CTFE, trifluoroethylene, vinyl fluoride and HFP are preferred, TFE, CTFE and HFP are more preferred, TFE and HFP are still more preferred, and TFE is most preferred. Such ethylenic fluoromonomers may be used singly or in combination of two or more.

The fluoropolymer electrolyte according to the invention is preferably a copolymer having a content of the COOZ group- or $SO_3Z$ group-containing monomer-derived repeating unit (α) of 10 to 95 mole percent and a content of the ethylenic fluoromonomer-derived repeating unit (β) of 5 to 90 mole percent, with the sum of the repeating unit (α) content and the repeating unit (β) content being 95 to 100 mole percent.

A more preferred lower limit to the content of the COOZ group- or SO$_3$Z group-containing monomer-derived repeating unit (α) is 15 mole percent, a still more preferred lower limit thereto is 20 mole percent, a more preferred upper limit thereto is 60 mole percent, and a still more preferred upper limit thereto is 50 mole percent.

A more preferred lower limit to the content of the ethylenic fluoromonomer-derived repeating unit (β) is 35 mole percent, a still more preferred lower limit thereto is 45 mole percent, a more preferred upper limit thereto is 85 mole percent, and a still more preferred upper limit thereto is 80 mole percent.

The fluoropolymer electrolyte according to the invention may further comprise, as a repeating unit derived from a third component monomer other than those mentioned above, a repeating unit (γ) derived from a vinyl ether other than the COOZ group- or SO$_3$Z group-containing monomer, preferably at a content level of 0 to 5 mole percent, more preferably not higher than 4 mole percent, still more preferably not higher than 3 mole percent.

The composition of the fluoropolymer electrolyte can be calculated from the measured values obtained in melt NMR at 300° C., for instance.

The vinyl ether which is other than the COOZ group- or SO$_3$Z group-containing monomer and constitutes the repeating unit (γ) is not particularly restricted provided that it does not contain either COOZ group or SO$_3$Z group; thus, it includes, among others, fluorovinyl ethers, more preferably perfluorovinyl ethers, represented by the general formula (IV):

$$CF_2=CF-O-Rf^2 \quad (IV)$$

wherein Rf$^2$ represents a fluoroalkyl group containing 1 to 9 carbon atoms or a fluoropolyether group containing 1 to 9 carbon atoms, or hydrogen-containing vinyl ethers represented by the general formula (V):

$$CHY^5=CF-O-Rf^3 \quad (V)$$

wherein Y$^5$ represents H or F and Rf$^3$ represents a straight or branched fluoroalkyl group containing 1 to 9 carbon atoms, which may contain at least one ether group. Such vinyl ethers may be used singly or two or more of them may be used in combination.

When the fluoropolymer electrolyte according to the invention is used as an electrolyte membrane, the membrane preferably has a thickness of not less than 1 μm but not more than 500 μm, more preferably not less than 2 μm but not more than 100 μm, still more preferably not less than 5 μm but not more than 50 μm. A thin membrane can lead to a reduction in direct current resistance during power generation but may possibly cause an increased gas permeation, so that such an appropriate range as specified above is desirable. In certain cases, the membrane may further comprise a porous membrane prepared from a PTFE membrane by stretching treatment, as described in Japanese Kokai Publication H08-162132, or a fibrillated fiber, as described in Japanese Kokai Publication S53-149881 and Japanese Patent Publication S63-61337.

The fluoropolymer electrolyte according to the invention can also be used as an electrolyte binder in an electrode catalyst layer. In such a case, the electrode catalyst layer is preferably formed by applying an electrode ink obtained by preparing a fluoropolymer electrolyte solution by dispersing the fluoropolymer electrolyte according to the invention in a solvent and admixing an electrode catalyst such as a carbon-supported Pt therewith; the ink application is followed by drying. The amount of the fluoropolymer electrolyte supported per unit electrode surface area, in the state after the electrode catalyst layer formation, is preferably 0.001 to 10 mg/cm$^2$, more preferably 0.01 to 5 mg/cm$^2$, still more preferably 0.1 to 1 mg/cm$^2$.

A unit constituted of an electrolyte membrane and two, namely an anode and a cathode, electrode catalyst layers joined thereto in a manner of sandwiching the same therebetween is called a membrane-electrode assembly (hereinafter sometimes abbreviated as "MEA"). Such a unit that further comprises a pair of gas diffusion layers opposite to each other and joined to the outside of the respective electrode catalyst layers is also called MEA in certain cases.

The electrode catalyst layer is constituted of fine particles of a catalyst metal and a conductive agent for supporting the particles and, if necessary, contains a water repellent. The catalyst to be used in the electrode may be any metal capable of promoting an oxidation reaction of hydrogen and a reduction reaction of oxygen and, thus, it includes, among others, platinum, gold, silver, palladium, iridium, rhodium, ruthenium, iron, cobalt, nickel, chromium, tungsten, manganese, vanadium, and an alloy of these; among them, platinum is mainly used.

The amount of the electrode catalyst supported per unit electrode surface area, in the state after electrode catalyst layer formation, is preferably 0.001 to 10 mg/cm$^2$, more preferably 0.01 to 5 mg/cm$^2$, most preferably 0.1 to 1 mg/cm$^2$.

The MEA obtained as mentioned above or the MEA further comprising a pair of opposing gas diffusion electrodes, as the case may be, is further combined with those constituents which are generally used in a solid polymer electrolyte fuel cell, such as a bipolar plate and a packing plate, whereby a solid polymer electrolyte fuel cell is constituted.

The term "bipolar plate" means a plate or the like made of a graphite-resin composite material or a metal with grooves formed on the surface thereof for such a gas as a fuel or an oxidizing agent to flow through them. The bipolar plate has not only a function to transfer electrons to an external load circuit but also a function as a channel structure to feed a fuel or an oxidizing agent to the vicinity of the electrode catalyst. A fuel cell is produced by stacking a plurality of unit cells each constituted by inserting an MEA between two such bipolar plates.

In the following, the production method for the fluoropolymer electrolyte according to the invention is described.

(Production Method for Fluoropolymer Electrolyte)

The fluoropolymer electrolyte according to the invention can be produced, for example, by a production method comprising the step (1) of obtaining a fluoropolymer electrolyte precursor by the polymerization technique to be described later herein and the step (2) of obtaining the fluoropolymer electrolyte by subjecting the fluoropolymer electrolyte precursor to a chemical treatment.

It is preferred that the fluoropolymer electrolyte precursor mentioned above have a group convertible to COOZ or SO$_3$Z group (wherein Z represents an alkali metal, an alkaline earth metal, hydrogen atom or NR$^1$R$^2$R$^3$R$^4$ in which R$^1$, R$^2$, R$^3$ and R$^4$ each independently represents an alkyl group containing 1 to 3 carbon atoms or hydrogen atom) by the chemical treatment.

The step (1) mentioned above preferably comprises copolymerizing an ethylenic fluoromonomer and a fluorovinyl compound having a group convertible to a COOZ or SO$_3$Z group (wherein Z represents an alkali metal, an alkaline earth metal, hydrogen atom or NR$^1$R$^2$R$^3$R$^4$ in which R$^1$, R$^2$, R$^3$ and $R^4$ each independently represents an alkyl group containing 1 to 3 carbon atoms or hydrogen atom) (hereinafter such fluorovinyl compound being referred to as "fluorovinyl compound" for short) by the chemical treatment, to give the fluoropolymer electrolyte precursor.

Preferred as the above-mentioned fluorovinyl compound is a fluorovinyl compound represented by the general formula (VI):

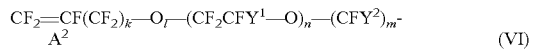

(VI)

wherein $Y^1$ represents F, Cl or a perfluoroalkyl group; k represents an integer of 0 to 2, l represents 0 or 1, and n represents an integer of 0 to 8 and the n atoms or groups of $Y^1$ may be the same or different; $Y^2$ represents F or Cl; m represents an integer of 0 to 6 provided that when m=0, l=0 and n=0; the m atoms of $Y^2$ may be the same or different; and $A^2$ represents $SO_2Z^1$ or $COZ^2$ in which $Z^1$ represents a halogen element and $Z^2$ represents an alkoxy group containing 1 to 3 carbon atoms or a halogen element.

Referring to the above general formula (VI), it is preferred from the viewpoint of synthesis and operation that k be 0 and l be 1. For obtaining a reduced EW value, it is more preferred that n be 0 or 1, still more preferably 0. Further, it is more preferred that $Y^2$ be F and m be an integer of 2 to 6, it is still more preferred that $Y^2$ be F and m be 2 or 4, and it is most preferred that $Y^2$ be F and m be 2.

As specific examples of the fluorovinyl compound represented by the above general formula (VI), there may be mentioned, among others, the following:

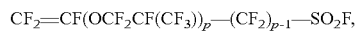

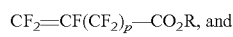, and

In the above formulas, p represents an integer of 1 to 8 and R represents an alkyl group containing 1 to 3 carbon atoms.

In the step (1) mentioned above, one or a combination of two or more of such fluorovinyl compounds as mentioned above may be used.

As the above-mentioned ethylenic fluoromonomer, there may be mentioned those already enumerated hereinabove. If desired, a third component monomer other than the ethylenic fluoromonomer and the fluorovinyl compound may be copolymerized therewith.

The following polymerization methods may be mentioned as the method of polymerization in the step (1).

(i) A method comprising using a polymerization solvent such as a fluorinated hydrocarbon and realizing the polymerization by reacting the fluorovinyl compound with a gaseous ethylenic fluoromonomer in a state charged and dissolved in that polymerization solvent (solution polymerization). Usable as the above-mentioned fluorinated hydrocarbon is a group of compounds generically referred to as "flons", for example trichlorotrifluoroethane and 1,1,1,2,3,4,4,5,5,5-decafluoropentane.

(ii) A method comprising carrying out the polymerization of the fluorovinyl compound using the fluorovinyl compound per se as a polymerization solvent without using such a solvent as the fluorinated hydrocarbon (bulk polymerization).

(iii) A method comprising using an aqueous solution of a surfactant as a polymerization solvent and carrying out the polymerization by reacting the fluorovinyl compound with a gaseous ethylenic fluoromonomer in a state charged and dissolved in that polymerization solvent (emulsion polymerization).

The above emulsion polymerization may be carried out by the method comprising using an aqueous solution of a surfactant and a coemulsifier such as an alcohol and carrying out the polymerization by reacting the fluorovinyl compound with a gaseous ethylenic fluoromonomer in a state charged and emulsified in that aqueous solution (miniemulsion polymerization, microemulsion polymerization).

(iv) A method comprising using an aqueous solution of a suspension stabilizer and carrying out the polymerization by reacting the fluorovinyl compound with a gaseous ethylenic fluoromonomer in a state charged and suspended in that aqueous solution (suspension polymerization).

Preferred among them for efficiently obtaining polymers with an equivalent weight (EW) of not less than 250 but not more than 700 is the method (iii), namely emulsion polymerization.

For adjusting the EW within the range of not less than 250 but not more than 700, the use of the fluorovinyl compound in an increased proportion is preferable. Generally, however, the reactivity of the fluorovinyl compound is markedly low as compared with the ethylenic fluoromonomer, so that the reaction will become slow and a prolonged period of time may possibly be required for the polymerization.

Generally, a radical polymerization reaction involves a mechanism of termination by coupling of two radicals. The polymerization methods mentioned above under (i), (ii) and (iv) cannot exclude a possibility of a molecular weight being reduced by that coupling; for increasing the molecular weight, a radical concentration must be markedly lowered in some instances, which results in a further reduced rate of reaction and thus it substantially becomes difficult to produce a desired polymer.

On the other hand, in the above-mentioned emulsion polymerization (including the miniemulsion polymerization and microemulsion polymerization), each minute particle constitutes each polymerization field and a probability of two or more radicals occurring in one and the same polymerization field is generally considered to be low. Therefore, as compared with the other polymerization methods, it is possible to increase the number of growing radicals per unit volume; hence, an apparent rate of polymerization can be increased.

The step (1) is preferably one in which a fluoropolymer electrolyte precursor is obtained by the method (iii) mentioned above at a polymerization temperature of not lower than 0° C. but not higher than 40° C. For uncertain reasons, it becomes possible to control the distance between ionic clusters of the fluoropolymer electrolyte precursor within the specific range mentioned above when the polymerization reaction is carried out at the polymerization temperature mentioned above; thus, a high conductivity can be realized even at low humidity levels. More preferably, the polymerization temperature is not lower than 5° C. but not higher than 35° C.

The above emulsion polymerization is preferably one in which the fluorovinyl compound and the gaseous ethylenic fluoromonomer are subjected to radical copolymerization in an aqueous solution of the surfactant in a pressure vessel by means of radicals generated from a polymerization initiator. In that case, the fluorovinyl compound may be charged and emulsified under application of a strong shearing force in the presence of the surfactant and the coemulsifier such as an alcohol.

For controlling the composition of a product polymer, a manner for controlling a pressure due to the gaseous ethylenic fluoromonomer is desired. The pressure mentioned above is preferably not lower than −0.05 MPaG but not higher than 2.0 MPaG. The pressure (MPaG) so referred to herein is a value of a pressure gage (gage pressure), with atmospheric pressure being taken as 0 MPa. Generally, low pressure levels are preferred for lowering the EW; however, an excessively low pressure will cause a prolonged polymerization time, possibly resulting in inefficiency. A more preferred lower limit to the pressure in question is 0.0 MPaG, and a still more preferred lower limit thereto is 0.1 MPaG. A more preferred upper limit is 1.0 MPaG, and a still more preferred upper limit is 0.7 MPaG.

Further, it is desirable to supplement the gaseous ethylenic fluoromonomer in an appropriate manner since, otherwise, the pressure generally falls as a result of consumption of the gaseous ethylenic fluoromonomer with the progress of the polymerization reaction. A manner for supplementary feeding of the fluorovinyl compound is also preferably employed since that compound is consumed simultaneously. The fluorovinyl compound to be supplemented may be charged and emulsified together with the surfactant and the coemulsifier such as an alcohol under application of a strong shearing force. In cases where the fluorovinyl compound is in a liquid form, use can be made of a method for feeding under pressure by means of a metering pump or a method for feeding under pressure by means of a pressurized inert gas, for instance.

It is desirable that the fluoropolymer electrolyte precursor mentioned above be melt-flowable. In this mode of practice, an index "melt flow rate" (hereinafter abbreviated as "MFR") can be used as an indicator of the degree of a polymerization of the fluoropolymer electrolyte precursor. In this mode of practice, the MFR of the fluoropolymer electrolyte precursor is preferably not lower than 0.01, more preferably not lower than 0.1, still more preferably not lower than 0.3. An upper limit to the MFR is preferably set at 100 or below, more preferably at 20 or below, still more preferably at 16 or below, particularly preferably at 10 or below. At MFR levels lower than 0.01, a molding process, such as a membrane formation, will possibly become difficult. When the MFR is higher than 100, a membrane obtained by molding that precursor will possibly gain a diminished strength, so that when it is used in a fuel cell, the cell will possibly be reduced in durability as well.

For attaining an MFR of not lower than 0.01 but not higher than 100, it is desirable that the emulsion polymerization be carried out at a temperature of not lower than 0° C. but not higher than 40° C. At temperatures higher than 40° C., radicals at polymer termini undergo β rearrangement and a rate of the disproportionation reaction leading to termination of the polymerization is thereby increased, so that it may become impossible to obtain a high molecular weight polymer. The polymerization temperature is more preferably not higher than 35° C., still more preferably not higher than 30° C. On the other hand, at temperatures lower than 0° C., the polymerization occurs very slowly, possibly leading to very low productivity. The temperature is more preferably not lower than 5° C., still more preferably not lower than 10° C.

The polymerization initiator to be used in the step (1) is preferably a water-soluble one, for example one selected from among an inorganic peroxide such as a persulfate compound, a perborate compound, a perchlorate compound, a perphosphate compound and a percarbonate compound; an organic peroxide such as disuccinyl peroxide, tert-butyl permaleate and tert-butyl hydroperoxide; and so forth. The inorganic peroxide mentioned above may be in the form of an ammonium salt, a sodium salt or a potassium salt, for instance.

The so-called redox system catalyst resulting from combination of the above-mentioned water-soluble polymerization initiator and a reducing agent is also suited for use. As the reducing agent, there may be mentioned, for example, a sulfite, a hydrogensulfite, a salt of a low-valence ion of iron, copper, cobalt, etc., hypophosphorous acid, a hypophosphite, an organic amine such as N,N,N',N'-tetramethylethylenediamine and, further, a reducing sugar such as an aldose and a ketose. In particular, when the polymerization temperature is not higher than 30° C., the use of such a redox system initiator is preferred.

An azo compound is also the most preferred initiator in the practice of the invention; usable is 2,2'-azobis-2-methylpropionamidine hydrochloride, 2,2'-azobis-2,4-dimethylvaleronitrile, 2,2'-azobis-N,N'-dimethyleneisobutyramidine hydrochloride, 2,2'-azobis-2-methyl-N-(2-hydroxyethyl) propionamide, 2,2'-azobis-2-(2-imidazolin-2-yl)propane and a salt thereof, and 4,4'-azobis-4-cyanovaleric acid and a salt thereof, among others. Further, it is also possible to use two or more of such polymerization initiators as mentioned above in combination. The amount of the polymerization initiator is generally 0.001 to 5% by mass.

The polymerization initiator may be charged into a pressure vessel prior to introduction of the ethylenic fluoromonomer or, alternatively, it may be fed into the vessel under pressure in the form of an aqueous solution after introduction of the ethylenic fluoromonomer.

In cases where the redox system initiator is used, a technique is preferred which comprises successively supplementing both or either one of the polymerization initiator and the reducing agent.

The emulsifier to be used in the step (1) is not particularly restricted but preferably is one low in chain transferability, for example an emulsifier represented by $RfZ^3$. In the formula, Rf is an alkyl group containing 4 to 20 carbon atoms in which the hydrogen atoms have been partially or fully substituted by a fluorine atom or atoms and which may contain one or more ether oxygen atoms and may have an unsaturated bond copolymerizable with the ethylenic fluoromonomer. $Z^3$ represents a dissociable polar group, preferably —$COO^-B^+$ or —$SO_3^-B^+$ in which $B^+$ is a monovalent cation such as an alkali metal ion, ammonium ion or hydrogen ion.

As the emulsifier represented by $RfZ^3$, there may be mentioned, for example, $Y(CF_2)_nCOO^-B^+$ (n representing an integer of 4 to 20 and Y representing fluorine or hydrogen atom), $CF_3$—$OCF_2CF_2$—$OCF_2CF_2COO^-B^+$ and $CF_3$—$(OCF(CF_3)CF_2)_nCOO^-B^+$ (n representing an integer of 1 to 3).

The level of addition of the emulsifier is not particularly restricted but suitably is not smaller than 0.01% by mass but not larger than 10% by mass in the aqueous solution. As the emulsifier addition level is raised, the number of polymerized particles tends to increase and, hence, an apparent rate of polymerization tends to increase. At addition levels lower than 0.01% by mass, emulsified particles may no longer be maintained stably. At levels exceeding 10% by mass, a washing procedure in an after-treatment step becomes difficult to perform. A more preferred lower limit is 0.05% by mass, and a still more preferred lower limit is 0.1% by mass. A more preferred upper limit is 5% by mass, and a still more preferred upper limit is 3% by mass.

For increasing the number of polymerized particles in the step (1), it is also possible to carry out the so-called "seed polymerization" which comprises carrying out the polymerization using a large amount of the emulsifier, then diluting the thus-obtained dispersion and continuing the polymerization.

A polymerization time is not particularly restricted but generally is 1 to 48 hours. A pH during polymerization is not particularly restricted, either, but the polymerization may be carried out while adjusting the pH according to need. A pH adjusting agent to be used on that occasion includes, among others, an alkalizing agent such as sodium hydroxide, potassium hydroxide and ammonia, a mineral acid such as phosphoric acid, sulfuric acid and hydrochloric acid, and an organic acid such as formic acid and acetic acid.

A chain transfer agent may also be used for adjusting the molecular weight and the molecular weight distribution. As a preferred chain transfer agent, there may be mentioned a gaseous hydrocarbon such as ethane and pentane, a water-soluble compound such as methanol, and an iodine compound, among others. In particular, an iodine compound is preferred since it makes it possible to produce a block polymer by the so-called iodine transfer polymerization.

From the viewpoint that a durability of the fluoropolymer electrolyte can be improved by increasing the molecular weight thereof, it is preferred that any chain transfer agent be not used in the step (1).

Unstable terminal groups of the fluoropolymer electrolyte precursor obtained in the step (1) may be subjected to a stabilization treatment so that the durability of the fluoropolymer electrolyte obtained by the production method according to the invention may be improved. The unstable terminal groups of the fluoropolymer electrolyte precursor include carboxylic acid, a carboxylic acid salt, a carboxylic acid ester, carbonate, a hydrocarbon and methylol group, among others, and the actually existing species depend on the method of polymerization and the initiator, the chain transfer agent and a polymerization terminator species employed, among others.

When the emulsion polymerization is selected as the method of polymerization and no chain transfer agent is used, the unstable terminal groups are mostly carboxylic acid groups.

A method of stabilizing the unstable terminal groups of the fluoropolymer electrolyte precursor mentioned above is not particularly restricted but there may be mentioned, among others, a method comprising a treatment with a fluorinating agent for stabilization in the form of —$CF_3$ and a method comprising decarboxylation under heating for stabilization in the form of —$CF_2H$.

As for the method of stabilization in the form of —$CF_3$ by treatment with a fluorinating agent, the use of a gaseous fluorinating agent is preferred from the ease-of-handling viewpoint, and $F_2$, $NF_3$, $PF_5$, $SF_4$, $IF_5$, $ClF$ and $ClF_3$ may be mentioned among others. These fluorinating agents may be used in a form diluted with an inert gas such as nitrogen. The treatment temperature is preferably not lower than 0° C. but not higher than 300° C., more preferably not lower than 50° C. but not higher than 200° C., still more preferably not lower than 80° C. but not higher than 150° C. The treatment pressure is preferably not lower than −0.05 MPaG but not higher than 1 MPaG, more preferably not lower than −0.02 MPaG but not higher than 0.5 MPaG, as expressed in terms of gage pressure.

The production method according to the invention preferably comprises the step (2) of subjecting the fluoropolymer electrolyte precursor obtained in the step (1) to the chemical treatment to give the fluoropolymer electrolyte. As the chemical treatment, there may be mentioned, among others, a hydrolysis treatment and an acid treatment, and the hydrolysis treatment may consist in immersion in an basic reacting liquid.

The above-mentioned basic reacting liquid is not particularly restricted but preferably is an aqueous solution of an alkali metal or alkaline earth metal hydroxide such as sodium hydroxide or potassium hydroxide. The content of the alkali metal or alkaline earth metal hydroxide thereof is not restricted but is preferably 10 to 30% by mass. The reacting liquid mentioned above preferably contains a swelling organic compound such as methyl alcohol, ethyl alcohol, acetone, DMSO, DMAC or DMF. The content of the swelling organic compound thereof is preferably 1 to 50% by mass. While a treatment temperature varies depending on a solvent species, a solvent composition and other factors, the treatment time can be reduced by raising the temperature. If the treatment temperature is excessively high, the polymer electrolyte precursor may possibly be dissolved and, in such a case, the handling becomes difficult; hence, the treatment is preferably carried out at 20 to 160° C. For obtaining a high level of conductivity, it is preferred that all the functional groups convertible to $SO_3H$ by hydrolysis undergo the hydrolysis treatment. Therefore, a prolonged treatment time is preferred. Since, however, an excessively long time sometimes results in reduced productivity, a treatment time of 0.5 to 48 hours is preferred.

It is also preferable to obtain the fluoropolymer electrolyte in a protonated form by thoroughly washing the product obtained after the above-mentioned hydrolysis treatment in the step (2) with water, if desirable with warm water, followed by the acid treatment. The acid to be used in the acid treatment is not particularly restricted provided that it is such an mineral acid as hydrochloric acid, sulfuric acid or nitric acid or such an organic acid as oxalic acid, acetic acid, formic acid or trifluoroacetic acid.

In cases where the fluorinated electrolyte precursor is in a film form as a result of molding, a film obtained after such hydrolysis treatment and acid treatment as mentioned above can be used as a fluorinated electrolyte membrane in the fuel cell.

(Polymer Electrolyte Solution)

The fluoropolymer electrolyte according to the invention can also be dissolved or suspended in an appropriate solvent (solvent having good affinity for the resin). As the appropriate solvent, there may be mentioned, for example, water, a protic organic solvent such as ethanol, methanol, n-propanol, isopropyl alcohol, butanol and glycerol, and an aprotic solvent such as N,N-dimethylformamide, N,N-dimethylacetamide and N-methylpyrrolidone. These may be used singly or two or more of them may be used in combination. In particular, in cases where only one solvent species is used, the use of water alone is preferred. In cases where two or more species are used in combination, a mixed solvent composed of water and a protic organic solvent(s) is particularly preferred.

The method of dissolution or suspending is not particularly restricted. For example, the polymer electrolyte is first placed in the mixed solvent composed of water and the protic organic solvent, for instance, under conditions such that the total solid concentration may amount to 1 to 50% by mass. Then, the resulting composition is placed in an autoclave, if necessary equipped with an inner cylinder made of glass, and, after substitution of the inside air with an inert gas such as nitrogen, the contents are heated with stirring for 1 to 12 hours under conditions such that the inside temperature is within the range of 50° C. to 250° C. A solution or suspension is thereby obtained. On that occasion, a higher total solid concentration is preferred from a yield viewpoint but an excessively increased concentration may possibly allow an undissolved portion to remain; hence, the concentration is preferably 1 to 50% by mass, more preferably 3 to 40% by mass, still more preferably 5 to 30% by mass.

In cases where the protic organic solvent is used, a mixing ratio between water and the protic organic solvent can be properly selected according to a dissolution method, dissolution conditions, a polymer electrolyte species, a total solid concentration, a dissolution temperature, and a rate of stirring, among others. As for the mass ratio of the protic organic solvent to water, a water-to-protic organic solvent ratio of 1:0.1 to 10 is preferred, and a water-to-organic solvent ratio of 1:0.1 to 5 is particularly preferred.

Such a solution or suspension comprises one or more of an emulsion (liquid particles being dispersed in a liquid as colloidal particles or coarser particles to give a milk-like appearance), a suspension (solid particles being dispersed in a liquid as colloidal particles or microscopically detectable particles), a colloidal liquid (resulting from dispersion of macromolecules) and a micellar liquid (a lyophilic colloidal dispersion system resulting from intermolecular force-due association of a large number of small molecules), among others.

Such a solution or suspension can be concentrated. The method of concentration is not particularly restricted. Usable is, for example, the method comprising heating to evaporate the solvent and the method comprising concentration under reduced pressure. As for the solid content of the resulting coating composition, an excessively high level thereof results in an increased viscosity, possibly making it difficult to handle the composition whereas, when it is too low, the productivity lowers in certain instances; therefore, it is preferred that the coating composition have a final solid content of 0.5 to 50% by mass.

The solution or suspension obtained in the above manner is more preferably filtered from the viewpoint of removing a coarser particle fraction. The method of filtration is not particularly restricted but any of those ordinary methods in conventional use is applicable. For example, mention may typically be made of the method comprising pressure filtration using a filter made by processing a filtering material showing a standard filter rating for ordinary use. As regards the filter, the use is preferred of such a filtering material that the 90% collection particle size is 10 to 100 times the average particle size of the particles. This filtering material may be filter paper or such a filtering material as a sintered metal filter. In the case of filter paper, in particular, the 90% collection particle size is preferably 10 to 50 times the average particle size of the particles. In the case of the sintered metal filter, the 90% collection particle size is preferably 50 to 100 times the average particle size of the particles. By setting the 90% collection particle size at a level of not lower than 10 times the average particle size, it becomes possible to prevent a pressure required on the occasion of liquid feeding from becoming excessively high and to prevent the filter from being clogged in a short period of time. On the other hand, to set that particle size at a level not higher than 100 times the average particle size is preferred from the viewpoint of efficiently removing those agglomerates of particles or undissolved resin portions which cause the occurrence of foreign matter in the film.

The thus-obtained fluoropolymer electrolyte solution can be used in producing the electrode catalyst layer, as mentioned above, and in producing the fluorinated electrolyte membrane by solvent-casting method.

EXAMPLES

The following examples illustrate certain typical modes of practice of the present invention more specifically. The modes of practice of the present invention are, however, by no means limited to these modes of practice.

The methods of evaluation and measurement as used in these modes of practice are as follows.

(EW Measurement)

A polymer electrolyte membrane in a state in which counter ions of the ion exchange groups are protons, about 2 to 20 $cm^2$ in area, is immersed in 30 ml of a saturated aqueous solution of NaCl at 25° C. and allowed to remain there with stirring for 30 minutes. Then, a proton content in the saturated aqueous solution of NaCl is determined by neutralization titration using a 0.01 N aqueous solution of sodium hydroxide with phenolphthalein as an indicator. A polymer electrolyte membrane obtained after neutralization and now in a state in which the counter ions of the ion exchange groups are sodium ions is rinsed with pure water, further dried under vacuum and weighed. The equivalent weight EW (g/eq) is calculated according to the following expression (2) in which M (mmol) is the mole number of sodium hydroxide as required for neutralization and W (mg) is the weight of the polymer electrolyte membrane in a state in which the counter ions of the ion exchange groups are sodium ions:

$$EW=(W/M)-22 \qquad (2).$$

(Distance Between Clusters Calculation)

A plurality of polymer electrolyte membranes are stacked up to a total thickness of about 0.25 mm and the stack is set in a humidity-controllable cell for small angle X-ray. The test specimen is maintained under conditions of 25° C. and 50% RH for 30 minutes and then subjected to X ray irradiation for scattering measurement. As for the measurement conditions, the X-ray wavelength $\lambda$ is 0.154 nm, the camera length is 515 mm, and an imaging plate is used as the detector. The two-dimensional scattering pattern obtained from the imaging plate is subjected to the empty cell scattering correction and the detector background correction, followed by circular averaging, to give a one-dimensional scattering profile. The Bragg angle $\theta m$ at the cluster structure-due peak position occurring in the region $2\theta>1°$ is read out from the scattering profile obtained by plotting the scattering intensity data against the Bragg angle $\theta$, and the distance between ionic clusters d is calculated from the following formula:

$$d=\lambda/2/\sin(\theta m) \qquad (1)$$

(Conductivity Measurement)

Measurements are made using an MSB-AD-V-FC polymer membrane water content test apparatus manufactured by BEL Japan, Inc., as follows. A specimen having a width of 1 cm and a length of 3 cm is excised from a polymer electrolyte membrane molded and having a thickness of 50 μm and set in a conductivity measurement cell. The conductivity measurement cell is then set in the chamber of the above-mentioned test apparatus, and the chamber inside is adjusted to 110° C. and below 1% RH. Then, water vapor generated using deionized water is introduced into the chamber to humidify the chamber inside to 10% RH, 30% RH, 50% RH, 70% RH, 90% RH and 95% RH, in that order, and conductivity measurements are made at the respective humidity levels mentioned above.

The humidity H at 0.10 S/cm is calculated based on the following formula (3):

$$H=(H2-H1)/(\sigma 2-\sigma 1)\times(0.1-\sigma 1)+H1 \qquad (3)$$

wherein H2 and σ2 are respectively the relative humidity and the conductivity at the first measurement point at which the conductivity goes over 0.10 S/cm and H1 and σ1 are respectively the highest relative humidity at which the conductivity does not surpass 0.10 S/cm and the conductivity on that occasion.

(Melt Flow Rate [MFR] Measurement Method)

The measurement of the MFR of each fluoropolymer is performed according to JIS K 7210 under conditions of 270° C. and a load of 2.16 kg using a MELT INDEXER TYPE C-5059D (product of Toyo Seiki Seisaku-Sho, Ltd., Japan). The mass of the polymer extruded is expressed in terms of the number of grams per 10 minutes.

(Polymer Composition)

The polymer composition is calculated from the measured values obtained in melt NMR at 300° C. For the NMR, a model AC300P Burker Fourier transform nuclear magnetic resonance spectrometer (FT-NMR) is used. For the calculation, the intensity of the tetrafluorothylene- and vinyl ether-due peak at about −120 ppm and the intensity of the vinyl ether-due peak at about −80 ppm are used, and the polymer composition is determined from the respective integrated peak values.

Example 1

A fluoropolymer electrolyte comprising the repeating units derived from $CF_2=CF_2$ and $CF_2=CF-O-(CF_2)_2-SO_3H$ and having an EW of 527 was produced in the following manner.

A 6-liter SUS-316 stainless steel pressure vessel equipped with a mixing blade and a jacket for temperature adjustment was charged with 2980 g of water purified by using a reverse osmosis membrane, 60 g of $C_7F_{15}COONH_4$ and 943 g of $CF_2=CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 400 rpm for the inside temperature to be maintained at 38° C., $CF_4$, as an explosion inhibitor, was introduced in an amount corresponding to 0.1 MPaG and, then, TFE was further introduced until arrival of the inside pressure at 0.5 MPaG. A solution of 6 g of $(NH_4)_2S_2O_8$ in 20 g of water was introduced into the system to initiate the polymerization. Thereafter, the inside pressure was maintained at 0.51 MPaG by supplementary addition of TFE.

After 408 minutes from the start of polymerization, namely at the point of time after additional introduction of 381 g of TFE, the unreacted TFE was discharged and the polymerization was thus terminated. Water (4400 g) was added to the polymerization mixture obtained (4260 g), and nitric acid was added to cause coagulation. The polymer coagulate was collected by filtration and, after three repetitions of redispersion in water and filtration, dried in a hot-air drier at 90° C. for 12 hours, followed by 12 hours of drying at 120° C., to give 893 g of a polymer.

The polymer obtained showed an MFR of 16 g/10 minutes and had an $SO_3H$ group-containing monomer-derived repeating unit content of 29 mole percent.

The thus-obtained fluoropolymer electrolyte precursor was kept in contact with an aqueous solution containing potassium hydroxide (15% by mass) and methyl alcohol (50% by mass) at 80° C. for 20 hours for hydrolysis treatment, followed by 5 hours of immersion in water at 60° C. Then, the treatment comprising immersing in 2 N hydrochloric acid at 60° C. for 1 hour was repeated 5 times while the aqueous hydrochloric acid was each time replaced with a fresh portion; a subsequent washing with deionized water and drying gave a fluoropolymer electrolyte.

This fluoropolymer electrolyte, together with aqueous ethanol (water:ethanol=50.0:50.0 (mass ratio)), was placed in a 5-liter autoclave and, after tight closure, the contents were heated to 160° C. with stirring by means of a blade, and that temperature was maintained for 5 hours. Then, the autoclave was allowed to cool spontaneously, whereupon a homogeneous fluoropolymer electrolyte solution with a solid matter concentration of 5% by mass was obtained.

This fluoropolymer solution was concentrated at 80° C. under reduced pressure, and the thus-obtained casting solution having a solid matter concentration of 20% by mass was cast onto a tetrafluoroethylene film using a doctor blade. The coated film was then placed in an oven and subjected to 30 minutes of predrying at 60° C., then to 30 minutes of drying at 80° C. for removing the solvent and further to 1 hour of heat treatment at 160° C. to give a fluoropolymer electrolyte membrane with a thickness of about 50 μm.

This fluoropolymer electrolyte membrane had an EW of 527 and a distance between ionic clusters of 2.4 nm. The conductivity of this fluoropolymer electrolyte membrane as measured at 110° C. and 30% RH was 0.10 S/cm, and the conductivity measurement at 110° C. and 50% RH gave a high level of conductivity of 0.14 S/cm.

Example 2

A fluoropolymer electrolyte according to the invention comprising the repeating units derived from $CF_2=CF_2$ and $CF_2=CF-O-(CF_2)_2-SO_3H$ and having an EW of 578 was produced in the following manner.

A 6-liter SUS-316 stainless steel pressure vessel equipped with a mixing blade and a jacket for temperature adjustment was charged with 2980 g of water purified by using a reverse osmosis membrane, 60 g of $C_7F_{15}COONH_4$ and 490 g of $CF_2=CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 400 rpm for the inside temperature to be maintained at 38° C., $CF_4$, as an explosion inhibitor, was introduced in an amount corresponding to 0.1 MPaG and, then, TFE was further introduced until arrival of the inside pressure at 0.59 MPaG. A solution of 6 g of $(NH_4)_2S_2O_8$ in 20 g of water was introduced into the system to initiate the polymerization. Thereafter, the inside pressure was maintained at 0.59 MPaG by supplementary addition of TFE.

After 97 minutes from the start of polymerization, namely at the point of time after additional introduction of 179 g of TFE, the unreacted TFE was discharged and the polymerization was thus terminated. Water (3500 g) was added to the polymerization mixture obtained (3500 g), and nitric acid was added to cause coagulation. The polymer coagulate was collected by filtration and, after three repetitions of redispersion in water and filtration, dried in a hot-air drier at 90° C. for 12 hours, followed by 12 hours of drying at 120° C., to give 350 g of a polymer.

The polymer obtained showed an MFR of 2.3 g/10 minutes and had an $SO_3H$ group-containing monomer-derived repeating unit content of 25 mole percent.

A fluoropolymer electrolyte, a fluoropolymer electrolyte solution and a fluoropolymer electrolyte membrane were produced in the same manner as in Example 1 except that the fluorinated electrolyte precursor obtained in the above manner was used. As a result of the EW, the distance between ionic clusters and the conductivity measurements, the EW was 578 and the distance between ionic clusters was 2.5 nm, and high levels of conductivity, namely 0.10 S/cm at 110° C. and 40% RH and 0.12 S/cm at 110° C. and 50% RH, were obtained.

Example 3

A fluoropolymer electrolyte comprising the repeating units derived from $CF_2\!=\!CF_2$ and $CF_2\!=\!CF\!-\!O\!-\!(CF_2)_2\!-\!SO_3H$ and having an EW of 662 was produced in the following manner.

A 189-liter SUS-316 stainless steel pressure vessel equipped with a mixing blade and a jacket for temperature adjustment was charged with 90.6 kg of water purified by using a reverse osmosis membrane, 1.89 g of $C_7F_{15}COONH_4$ and 28.4 kg of $CF_2\!=\!CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 189 rpm for the inside temperature to be maintained at 34° C., $CF_4$, as an explosion inhibitor, was introduced in an amount corresponding to 0.1 MPaG and, then, TFE was further introduced until arrival of the inside pressure at 0.65 MPaG. A solution of 189 g of $(NH_4)_2S_2O_8$ in 3 liter of water was introduced into the system to initiate the polymerization. Thereafter, the inside pressure was maintained at 0.65 MPaG by supplementary addition of TFE.

After 188 minutes from the start of polymerization, namely at the point of time after additional introduction of 20 kg of TFE, the unreacted TFE was discharged and the polymerization was thus terminated. Water (200 kg) was added to the polymerization mixture obtained (132 kg), and nitric acid was added to cause coagulation. The polymer coagulate was collected by centrifugation and, after washing with flowing deionized water, dried in a hot-air drier at 90° C. for 24 hours, followed by 24 hours of drying at 150° C., to give 27 kg of a polymer.

The above polymer was quickly charged into a 50-liter Hastelloy vibrating reactor (product of Okawara Mfg. Co., Ltd.) and heated to 100° C. with vibration at a frequency of 50 rpm while the reactor was evacuated. Then, nitrogen was introduced to a gage pressure of −0.05 MPaG. A gaseous halogenating agent prepared by diluting $F_2$ gas with nitrogen gas to 20% by mass was introduced until arrival of the gage pressure at 0.0 MPaG, and the resulting state was maintained for 30 minutes.

The gaseous halogenating agent was discharged from the reactor and, after evacuation, a gaseous halogenating agent prepared by diluting $F_2$ gas with nitrogen gas to 20% by mass was introduced until arrival of the gage pressure at 0.0 MPaG, and the resulting state was maintained for 3 hours.

Thereafter, the reactor was cooled to room temperature, the gaseous halogenating agent was discharged from the reactor and, after three repetitions of evacuation and nitrogen substitution, the autoclave was opened, and 27 kg of a polymer was obtained.

The polymer obtained showed an MFR of 0.71 g/10 minutes and had an $SO_3H$ group-containing monomer-derived repeating unit content of 21 mole percent.

A fluoropolymer electrolyte, a fluoropolymer electrolyte solution and a fluoropolymer electrolyte membrane were produced in the same manner as in Example 1 except that the fluoropolymer electrolyte precursor obtained in the above manner was used. As a result of the EW, the distance between ionic clusters and the conductivity measurements, the EW was 662 and the distance between ionic clusters was 2.6 nm, and a high level of conductivity, namely 0.10 S/cm at 110° C. and 50% RH, was obtained.

Example 4

A fluoropolymer electrolyte comprising the repeating units derived from $CF_2\!=\!CF_2$ and $CF_2\!=\!CF\!-\!O\!-\!(CF_2)_2\!-\!SO_3H$ and having an EW of 512 was produced in the following manner.

A 6-liter SUS-316 stainless steel pressure vessel equipped with a mixing blade and a jacket for temperature adjustment was charged with 2950 g of water purified by using a reverse osmosis membrane, 60 g of $C_7F_{15}COONH_4$ and 920 g of $CF_2\!=\!CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 400 rpm for the inside temperature to be maintained at 30° C., $CF_4$, as an explosion inhibitor, was introduced in an amount corresponding to 0.1 MPaG and, then, TFE was further introduced until arrival of the inside pressure at 0.46 MPaG. A solution of 6 g of $(NH_4)_2S_2O_8$ in 20 g of water was introduced into the system and further a solution of 0.6 g of $Na_2SO_3$ in 10 g of water was fed into the system under the pressure to initiate the polymerization. Thereafter, the inside pressure was maintained at 0.46 MPaG by supplementary addition of TFE. The polymerization was continued, during which, after the lapse of 120 minutes and of 240 minutes from the start of polymerization, a solution of 0.6 g of $Na_2SO_3$ in 10 g of water was fed into under pressure each occasion.

After 360 minutes from the start of polymerization, namely at the point of time after additional introduction of 321 g of TFE, the unreacted TFE was discharged and the polymerization was thus terminated. Water (4400 g) was added to the polymerization mixture obtained (4020 g), and nitric acid was added to cause coagulation. The polymer coagulate was collected by filtration and, after three repetitions of redispersion in water and filtration, dried in a hot-air drier at 90° C. for 12 hours, followed by 12 hours of drying at 120° C., to give 643 g of a polymer.

The polymer obtained showed an MFR of 2.9 g/10 minutes and had an $SO_3H$ group-containing monomer-derived repeating unit content of 30 mole percent.

A fluoropolymer electrolyte, a fluoropolymer electrolyte solution and a fluoropolymer electrolyte membrane were produced in the same manner as in Example 1 except that the fluoropolymer electrolyte precursor obtained in the above manner was used. As a result of the EW, the distance between ionic clusters and the conductivity measurements, the EW was 512 and the distance between ionic clusters was 2.4 nm, and high levels of conductivity, namely 0.10 S/cm at 110° C. and 30% RH and 0.16 S/cm at 110° C. and 50% RH, were obtained.

Example 5

A fluoropolymer electrolyte comprising the repeating units derived from $CF_2\!=\!CF_2$ and $CF_2\!=\!CF\!-\!O\!-\!(CF_2)_2\!-\!SO_3H$ and having an EW of 559 was produced in the following manner.

A 6-liter SUS-316 stainless steel pressure vessel equipped with a mixing blade and a jacket for temperature adjustment was charged with 2950 g of water purified by using a reverse osmosis membrane, 60 g of $C_7F_{15}COONH_4$ and 920 g of $CF_2\!=\!CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 400 rpm for the inside temperature to be maintained at 25° C., $CF_4$, as an explosion inhibitor, was introduced in an amount corresponding to 0.1 MPaG and, then, TFE was further introduced until arrival of the inside pressure at 0.56 MPaG. A solution of 6 g of $(NH_4)_2S_2O_8$ in 20 g of water was introduced into the system and further a solution of 0.6 g of $Na_2SO_3$ in 10 g of water was fed into the system under the pressure to initiate the polymerization. Thereafter, the inside pressure was maintained at 0.46 MPaG by supplementary addition of TFE. The polymerization was continued, during which, after the lapse of 120 minutes and of 240 minutes from the start of polymerization, a solution of 0.6 g of $Na_2SO_3$ in 10 g of water was fed into under pressure each occasion.

After 360 minutes from the start of polymerization, namely at the point of time after additional introduction of 350 g of TFE, the unreacted TFE was discharged and the polymerization was thus terminated. Water (4400 g) was added to the polymerization mixture obtained (4020 g), and nitric acid was added to cause coagulation. The polymer coagulate was collected by filtration and, after three repetitions of redispersion in water and filtration, dried in a hot-air drier at 90° C. for 12 hours, followed by 12 hours of drying at 120° C., to give 680 g of a polymer.

The polymer obtained showed an MFR of 0.91 g/10 minutes and had an $SO_3H$ group-containing monomer-derived repeating unit content of 26 mole percent.

A fluoropolymer electrolyte, a fluoropolymer electrolyte solution and a fluoropolymer electrolyte membrane were produced in the same manner as in Example 1 except that the fluoropolymer electrolyte precursor obtained in the above manner was used. As a result of the EW, the distance between ionic clusters and the conductivity measurements, the EW was 559 and the distance between ionic clusters was 2.4 nm, and high levels of conductivity, namely 0.10 S/cm at 110° C. and 40% RH and 0.13 S/cm at 110° C. and 50% RH, were obtained.

Comparative Example 1

A fluoropolymer electrolyte comprising the repeating units derived from $CF_2=CF_2$ and $CF_2=CF-O-(CF_2)_2-SO_3H$ and having an EW of 720 was produced in the following manner.

A 189-liter SUS-316 stainless steel pressure vessel equipped with a mixing blade and a jacket for temperature adjustment was charged with 90.5 kg of water purified by using a reverse osmosis membrane, 0.945 g of $C_7F_{15}COONH_4$ and 5.68 kg of $CF_2=CFOCF_2CF_2SO_2F$, the system inside was purged with nitrogen and then evacuated and, thereafter, TFE was introduced until arrival of the inside pressure at 0.2 MPaG. Temperature regulation was carried out with stirring at 189 rpm for the inside temperature to be maintained at 47° C., $CF_4$, as an explosion inhibitor, was introduced in an amount corresponding to 0.1 MPaG and, then, TFE was further introduced until arrival of the inside pressure at 0.70 MPaG. A solution of 3 liter of $(NH_4)_2S_2O_8$ in 47 g of water was introduced into the system to initiate the polymerization. Thereafter, the inside pressure was maintained at 0.7 MPaG by supplementary addition of TFE. The polymerization was continued, during which 0.7 kg of $CF_2=CFOCF_2CF_2SO_2F$ was fed every time the TFE additionally fed amounted to 1 kg.

After 360 minutes from the start of polymerization, namely at the point of time after additional introduction of 24 kg of TFE, the unreacted TFE was discharged and the polymerization was thus terminated. Water (200 kg) was added to the polymerization mixture obtained (140 kg), and nitric acid was added to cause coagulation. The polymer coagulate was collected by centrifugation and, after washing with flowing deionized water, dried in a hot-air drier at 90° C. for 24 hours, followed by 24 hours of drying at 150° C., to give 34 kg of a polymer.

The above polymer was quickly charged into a 28 kg Hastelloy vibrating reactor (product of Okawara Mfg. Co., Ltd.) and heated to 100° C. with vibration at a frequency of 50 rpm while the reactor was evacuated. Then, nitrogen was introduced to a gage pressure of −0.05 MPaG. A gaseous halogenating agent prepared by diluting $F_2$ gas with nitrogen gas to 20% by mass was introduced until arrival of the gage pressure at 0.0 MPaG, and the resulting state was maintained for 30 minutes.

The gaseous halogenating agent was discharged from the reactor and, after evacuation, a gaseous halogenating agent prepared by diluting $F_2$ gas with nitrogen gas to 20% by mass was introduced until arrival of the gage pressure at 0.0 MPaG, and the resulting state was maintained for 3 hours.

Thereafter, the reactor was cooled to room temperature, the gaseous halogenating agent was discharged from the reactor and, after three repetitions of evacuation and nitrogen substitution, the reactor was opened, and 28 kg of a polymer was obtained.

The polymer obtained showed an MFR of 3.0 g/10 minutes and had an $SO_3H$ group-containing monomer-derived repeating unit content of 18 mole percent.

A fluoropolymer electrolyte solution and a fluoropolymer electrolyte membrane were produced in the same manner as in Example 1 except that the above-mentioned fluoropolymer electrolyte was used. As a result of the EW, the distance between ionic clusters and the conductivity measurements, the EW was 720 and the distance between ionic clusters was 3.1 nm, and a conductivity not satisfying desired level, namely 0.06 S/cm at 110° C. and 50% RH, was obtained.

Comparative Example 2

A fluoropolymer electrolyte comprising the repeating units derived from $CF_2=CF_2$ and $CF_2=CFOCF_2CF(CF_3)O(CF_2)_2-SO_3H$ and having an EW of 910 was produced in the following manner.

First, a fluorinated ion exchange resin precursor, namely a fluorocarbon copolymer of $CF_2=CF_2$ (hereinafter, TFE) and $CF_2=CFOCF_2CF(CF_3)O(CF_2)_2-SO_2F$ (hereinafter, S monomer), was produced by polymerization in the following manner.

A one-liter stainless steel autoclave was charged with 580 g of $CF_2ClCFCl_2$ (hereinafter, CFC113) and 280 g of $CF_2=CFOCF_2CF(CF_3)O(CF_2)_2-SO_2F$, and purged with nitrogen, followed by purging with TFE. The temperature was adjusted to 35° C. and the pressure of TFE to 0.157 MPaG, then 0.55 g of a CFC113 solution containing 5% by weight of $(n-C_3F_7COO-)_2$ was added, and the polymerization was carried out for about 3.5 hours. During the polymerization, TFE was fed from outside the system to maintain the pressure of TFE at a constant level. The remaining TFE was purged from the polymerization mixture obtained, the CFC113 was distilled off at 90° C. and ordinary pressure and, then, the remaining S monomer was distilled off at 90° C. under reduced pressure. The residual product was further dried at 150° C. under reduced pressure for 2 days, whereupon 10.5 g of a fluorinated ion exchange resin precursor was obtained.

The polymer obtained showed an MFR of 20 g/10 minutes and had an SO$_3$H group-containing monomer-derived repeating unit content of 18 mole percent.

A fluoropolymer electrolyte solution and a fluoropolymer electrolyte membrane were produced in the same manner as in Example 1 except that the above fluoropolymer electrolyte was used. As a result of the EW, the distance between ionic clusters and the conductivity measurements, the EW was 910 and the distance between ionic clusters was 3.1 nm, and a conductivity not satisfying desired level, namely 0.04 S/cm at 110° C. and 50% RH, was obtained.

Comparative Example 3

A fluoropolymer electrolyte comprising the repeating units derived from CF$_2$=CF$_2$ and CF$_2$=CF—O—(CF$_2$)$_2$—SO$_3$H and having an EW of 705 was produced in the following manner.

A 6-liter SUS-316 stainless steel pressure vessel equipped with a mixing blade and a jacket for temperature adjustment was charged with 2950 g of water purified by using a reverse osmosis membrane, 60 g of C$_7$F$_{15}$COONH$_4$ and 180 g of CF$_2$=CFOCF$_2$CF$_2$SO$_2$F, the system inside was purged with nitrogen and then evacuated and, thereafter, TFE was introduced until arrival of the inside pressure at 0.2 MPaG. Temperature regulation was carried out with stirring at 400 rpm for the inside temperature to be maintained at 48° C., CF$_4$, as an explosion inhibitor, was introduced in an amount corresponding to 0.1 MPaG and, then, TFE was further introduced until arrival of the inside pressure at 0.70 MPaG. A solution of 1.5 g of (NH$_4$)$_2$S$_2$O$_8$ in 20 g of water was fed into the system under pressure to initiate the polymerization. Thereafter, the inside pressure was maintained at 0.70 MPaG by supplementary addition of TFE. The polymerization was continued, during which 6.5 g of CF$_2$=CFOCF$_2$CF$_2$SO$_2$F was fed every time the TFE additionally fed amounted to 10 g.

After 218 minutes from the start of polymerization, namely at the point of time after additional introduction of 774 g of TFE, the unreacted TFE was discharged and the polymerization was thus terminated. Water (4400 g) was added to the polymerization mixture obtained (4400 g), and nitric acid was added to cause coagulation. The polymer coagulate was collected by filtration and, after three repetitions of redispersion in water and filtration, dried in a hot-air drier at 90° C. for 12 hours, followed by 12 hours of drying at 120° C., to give 1200 g of a polymer.

The polymer obtained showed an MFR of 3.5 g/10 minutes and had an SO$_3$H group-containing monomer-derived repeating unit content of 19 mole percent.

A fluoropolymer electrolyte solution and a fluoropolymer electrolyte membrane were produced in the same manner as in Example 1 except that the above-mentioned fluoropolymer electrolyte was used. As a result of the EW, the distance between ionic clusters and the conductivity measurements, the EW was 705 and the distance between ionic clusters was 2.7 nm, and a conductivity not satisfying desired level, namely 0.08 S/cm at 110° C. and 50% RH, was obtained.

Example 6

A fluoropolymer electrolyte comprising the repeating units derived from CF$_2$=CF$_2$ and CF$_2$=CF—O—(CF$_2$)$_2$—SO$_3$H and having an EW of 455 was produced in the following manner.

A 6-liter SUS-316 stainless steel pressure vessel equipped with a mixing blade and a jacket for temperature adjustment was charged with 2850 g of water purified by using a reverse osmosis membrane, 150 g of C$_7$F$_{15}$COONH$_4$ and 1150 g of CF$_2$=CFOCF$_2$CF$_2$SO$_2$F, the system inside was purged with nitrogen and then evacuated and, thereafter, TFE was introduced until arrival of the inside pressure at 0.07 MPaG. Temperature regulation was carried out with stirring at 400 rpm for the inside temperature to be maintained at 10° C. A solution of 6 g of (NH$_4$)$_2$S$_2$O$_8$ in 20 g of water was fed into the system under pressure and further a solution of 0.6 g of Na$_2$SO$_3$ in 10 g of water was fed into the system under the pressure to initiate the polymerization. Thereafter, the polymerization was continued while TFE was additionally fed to maintain the inside pressure at 0.07 MPaG. Further, a solution of 0.6 g of Na$_2$SO$_3$ in 10 g of water was injected at each 1-hour interval.

After 11 hours from the start of polymerization, namely at the point of time after additional introduction of 400 g of TFE, the unreacted TFE was discharged and the polymerization was thus terminated. Water (250 g) was added to the part of the polymerization mixture obtained (200 g), and nitric acid was added to cause coagulation. The polymer coagulate was collected by filtration and, after three repetitions of redispersion in water and filtration, dried in a hot-air drier at 90° C. for 24 hours, followed by 5 hours of drying at 120° C., to give 44.3 g of a polymer.

The polymer obtained showed an MFR of 0.4 g/10 minutes and had an SO$_3$H group-containing monomer-derived repeating unit content of 34 mole percent.

A fluoropolymer electrolyte, a fluoropolymer electrolyte solution and a fluoropolymer electrolyte membrane were produced in the same manner as in Example 1 except that the fluorinated electrolyte precursor obtained in the above manner was used. As a result of the EW, the distance between ionic clusters and the conductivity measurements, the EW was 455 and the distance between ionic clusters was 2.3 nm, and high levels of conductivity, namely 0.10 S/cm at 110° C. and 25% RH and 0.20 S/cm at 110° C. and 50% RH, were obtained.

The relationship between the distance between ionic clusters and the conductivity at 50% RH as revealed from the data obtained in the above-mentioned Examples 1 to 6 and Comparative Examples 1 to 3 is shown in FIG. 1. FIG. 1 is a graph obtained by plotting the results of Examples 1 to 6 and Comparative Examples 1 to 3, with the abscissa denoting the distance between ionic clusters and the ordinate denoting the conductivity at 50% RH. FIG. 1 indicates that the conductivity at 50% RH rapidly rises as the distance between ionic clusters decreases in the range not longer than 2.6 nm.

INDUSTRIAL APPLICABILITY

The highly conductive fluoropolymer electrolyte according to the invention makes it possible to provide a fuel cell showing high performance even under high-temperature low-humidification conditions. The fluoropolymer electrolyte according to the invention can be used in various fuel cells, including a direct methanol fuel cell, in water electrolysis, hydrohalic acid electrolysis and brine electrolysis, and in oxygen concentrators, humidity sensors and gas sensors, among others.

BRIEF DESCRIPTION OF THE DRAWING

FIG. 1 This FIGURE is a graph obtained by plotting the results of Examples 1 to 6 and Comparative Examples 1 to 3, with the abscissa denoting the distance between ionic clusters and the ordinate denoting the conductivity at 50% RH.

The invention claimed is:

1. A fluoropolymer electrolyte having an equivalent weight (EW) of not less than 250 but not more than 700 and a proton conductivity of not lower than 0.10 S/cm as measured at a temperature of 110° C. and a relative humidity of 50% RH and which comprises a repeating unit (α) derived from a COOZ group- or $SO_3Z$ group-containing monomer represented by the general formula (I):

$$CF_2\!=\!CF(CF_2)_k\!-\!O_l\!-\!(CF_2CFY^1\!-\!O)_n\!-\!(CFY^2)_m\!-\!A^1 \qquad (I)$$

wherein $Y^1$ represents F, Cl or a perfluoroalkyl group; k represents an integer of 0 to 2, l represents 0 or 1, and n represents an integer of 0 to 8 and n atoms or groups of $Y^1$ may be the same or different; $Y^2$ represents F or Cl; m represents an integer of 0 to 6 provided that when m=0, l=0 and n=0; m atoms of $Y^2$ may be the same or different; and $A^1$ represents COOZ or $SO_3Z$ in which Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom, and a repeating unit (β) derived from an ethylenic fluoromonomer copolymerizable with said COOZ group- or $SO_3Z$ group-containing monomer, the content of the repeating unit (α) being 10 to 95 mole percent and the content of the repeating unit (β) being 5 to 90 mole percent, with the sum of the repeating unit (α) content and the repeating unit (β) content being 95 to 100 mole percent, and has an ion cluster structure, and is obtained by a chemical treatment of a fluoropolymer electrolyte precursor, wherein said fluoropolymer electrolyte precursor has a melt flow rate of 16 g/10 minutes or below, wherein the distance between the ionic clusters at 25° C. and a relative humidity of 50% RH as calculated from the formula (I) given below following small angle X-ray measurement is not shorter than 0.1 nm but not longer than 2.6 nm:

$$d=\lambda/2/\sin(\theta m) \qquad (1)$$

wherein d is said distance between ionic clusters, λ is wavelength of incident X ray used in small angle X-ray scattering measurement and θm is peak-showing Bragg angle.

2. The fluoropolymer electrolyte according to claim 1, wherein k is 0, l is 1, $Y^1$ is F, n is 0 or 1, $Y^2$ is F, m is 2 or 4 and $A^1$ is $-SO_3H$.

3. The fluoropolymer electrolyte according to claim 2, wherein n is 0 and m is 2.

4. The fluoropolymer electrolyte according to claim 1, wherein said fluoropolymer electrolyte precursor has a group convertible to COOZ or $SO_3Z$ (wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom) upon said chemical treatment, is melt-flowable and has a melt flow rate of 0.01 to 16 g/10 minutes.

5. The fluoropolymer electrolyte according to claim 4, wherein the chemical treatment comprises immersion in an basic reacting liquid.

6. The fluoropolymer electrolyte according to claim 1, prepared by (1) obtaining the fluoropolymer electrolyte precursor by emulsion polymerization at a temperature of not lower than 0° C. but not higher than 40° C., and (2) obtaining the fluoropolymer electrolyte by subjecting the fluoropolymer electrolyte precursor to the chemical treatment.

7. An electrolyte membrane constituted of the fluoropolymer electrolyte according to claim 1.

8. An electrolyte solution containing the fluoropolymer electrolyte according to claim 1.

9. A membrane-electrode assembly comprising the fluoropolymer electrolyte according to claim 1.

10. A solid polymer fuel cell comprising the membrane-electrode assembly according to claim 9.

11. A production method for the fluoropolymer electrolyte as claimed in claim 1, comprising a step (1) of obtaining a fluoropolymer electrolyte precursor by emulsion polymerization and a step (2) of obtaining said fluoropolymer electrolyte by subjecting said fluoropolymer electrolyte precursor to a chemical treatment, said fluoropolymer electrolyte having an equivalent weight (EW) of not less than 250 but not more than 700 and a proton conductivity of not lower than 0.10 S/cm as measured at a temperature of 110° C. and a relative humidity of 50% RH and comprising a COOZ group- or $SO_3Z$ group-containing monomer unit, wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom, and has an ion cluster structure, wherein the distance between the ionic clusters at 25° C. and a relative humidity of 50% RH as calculated from the formula (I) given below following small angle X-ray measurement is not shorter than 0.1 nm but not longer than 2.6 nm:

$$d=\lambda/2/\sin(\theta m) \qquad (1)$$

wherein d is said distance between ionic clusters, λ is wavelength of incident X ray used in small angle X-ray scattering measurement and θm is peak-showing Bragg angle.

12. The production method according to claim 11, wherein the step (1) comprises carrying out the emulsion polymerization at a temperature of not lower than 0° C. but not higher than 40° C.

13. The production method according to claim 11, wherein the fluoropolymer electrolyte precursor has a group convertible to COOZ or $SO_3Z$ (wherein Z represents an alkali metal, an alkaline earth metal, hydrogen atom or $NR^1R^2R^3R^4$ in which $R^1$, $R^2$, $R^3$ and $R^4$ each independently represents an alkyl group containing 1 to 3 carbon atoms or hydrogen atom) by the chemical treatment, is melt-flowable and has a melt flow rate of 0.01 to 16 g/10 minutes.

* * * * *